United States Patent [19]

Nilsson

[11] Patent Number: 4,665,599

[45] Date of Patent: May 19, 1987

[54] MACHINE FOR THE PRODUCTION OF VENETIAN BLINDS

[76] Inventor: Berndt R. Nilsson, Adolf Fredriksgatan 6, S-217 74 Malmö , Sweden

[21] Appl. No.: 767,178

[22] PCT Filed: Apr. 12, 1985

[86] PCT No.: PCT/SE85/00171

§ 371 Date: Aug. 5, 1985

§ 102(e) Date: Aug. 5, 1985

[87] PCT Pub. No.: WO85/04687

PCT Pub. Date: Oct. 24, 1985

[30] Foreign Application Priority Data

Apr. 13, 1984 [SE] Sweden ................................ 8402096

[51] Int. Cl.[4] ............................................ B23P 10/04

[52] U.S. Cl. ..................................................... 29/24.5

[58] Field of Search ......................................... 29/24.5

[56] References Cited

U.S. PATENT DOCUMENTS 2,893,106 7/1959 Rosenbaum .......................... 29/24.5
3,531,838 10/1970 Pzeters ................................ 29/24.5
3,766,815 10/1973 Edixhoven ........................... 29/24.5
4,420,862 12/1983 Edixhoven ........................... 29/24.5
4,516,300 5/1985 Gaillard et al. ...................... 29/24.5

FOREIGN PATENT DOCUMENTS 323787 9/1970 Sweden .

*Primary Examiner*—Howard N. Goldberg
*Assistant Examiner*—Steven Nichols
*Attorney, Agent, or Firm*—Shapiro and Shapiro

[57] ABSTRACT

A Venetian blind production machine comprises a punching station with at least two groups of punching tools (14) for punching lift cord holes in at least two successive Venetian blind slats in the free end portion of a metal strip (6) inserted in the machine. The punching station is followed by a combined mounting and separating station, said separating station comprising at least a corresponding number of separating punches (17) for simultaneously separating the Venetian blind slats for the same number of simultaneously produced Venetian blinds. The invention is based on the idea that the advances of the metal strip (6) along the machine bed (2) is to occur for continuous and maximum periods of time with a minimum of acceleration and retardation cycles during the Venetian blind production.

9 Claims, 9 Drawing Figures

MACHINE FOR THE PRODUCTION OF VENETIAN BLINDS

The present invention relates to a machine for the production of Venetian blinds, said machine having a supply device for intermittently feeding a metal strip in the longitudinal direction of said strip from a supply reel through a number of ladder-tapes, and having a punching station with means for punching lift cord holes in the free end portion of the metal strip before this end portion is inserted in the ladder-tapes, and having a separating station for separating from the free end portion of the metal strip the individual Venetian blind slats inserted in the ladder-tapes.

A machine of this type is disclosed in Swedish patent specification No. 323,787 and has proved to be a highly efficient machine for the production of Venetian blinds. There is, however, a demand for still higher production rates, thereby to achieve an even higher output of the production of Venetian blinds. It has been found that the machine disclosed in above-mentioned patent, and other similar prior art machines, for mechanical reasons could not be redesigned for substantially higher production rates than those presently obtained. In view hereof, Venetian blind producers have need of an improved machine with which higher production rates can be achieved.

It therefore is an object of the present invention to provide a machine by which the production rate can be increased far beyond that of prior art Venetian blind production machines. Another object of the invention is to provide a Venetian blind production machine in which Venetian blinds of different lengths can be produced in one and the same production run. Further objects of the invention will appear from the following description.

Briefly stated, in one of its broad aspects, the invention provides a machine for the production of Venetian blinds, comprising means for intermittently advancing a strip of Venetian blind material lengthwise of the strip, and a lift cord hole punching station and a slat separating station arranged in succession along a path of advance of the strip such that the strip is advanced into the punching station and then into the separating station. The punching station has means operable upon an advance of the strip for punching lift cord holes in successive lengthwise portions of the strip, the successive portions corresponding to a plurality of Venetian blind slats. The separating station has means operable upon a further advance of the strip for simultaneously separating the successive punched portions of the strip from one another to yield a plurality of Venetian blind slats.

As will be described in detail later, a Venetian blind production machine according to the invention may comprise a punching station with at least two spaced punching tools operable upon an advance of a strip of Venetian blind material for punching lift cord holes in at least two successive portions of the free end of the strip. The punching station is followed by a combined mounting and separating station, said separating station comprising at least a corresponding number of separating punches for simultaneously separating the successive portions of the punched strip to yield separate Venetian blind slats for a plurality of concurrently produced Venetian blinds. The invention is based on the idea that the advance of the metal strip along the machine bed is to occur for continuous and maximum periods of time with a minimum of acceleration and retardation cycles during the Venetian blind production.

The invention thus is based on a new approach to the Venetian blind production technique, in that several Venetian blinds are manufactured in one and the same machine and in one and the same slat punching and slat separating run, the slats being separated simultaneously from one another and from the remaining portion of the metal strip by punching. This production technique thus makes it possible to increase the production rate of the machine to a considerable extent, and this increase is due not only to the fact that several Venetian blinds are manufactured at the same time, but also to the fact that the loss of time resulting from the acceleration and retardation of the metal strip passing through the machine is decreased. For example, if one wished to produce a Venetian blind having a length of 800 mm, and comprising 82 slats, this can be effected in prior art machines in about 80 seconds. According to the present invention, it is possible to produce in one and the same machine several Venetian blinds in succession, and for each additional Venetian blind one merely need add, under otherwise identical conditions in the production machine, about 18 seconds of machine time. If five Venetian blinds having a length of 800 mm and each comprising 82 slats are manufactured simultaneously in a machine according to the present invention, the total production time for these five Venetian blinds would be about 170 seconds. The machine time for each Venetian blind would than be about 34 seconds, and this should be compared with the machine time of about 80 seconds for producing a single Venetian blind in prior machines.

The invention provides yet another advantage in that the production capacity can be further increased by connecting two or more feed paths in parallel, in which case the machine has at least some punching tools which are common to or operated jointly for two or more of said feed paths.

The invention will be described in more detail below, reference being had to the accompanying drawings which illustrate different parts of an embodiment of a Venetian blind production machine according to the present invention. In the drawings.

Figure 8:
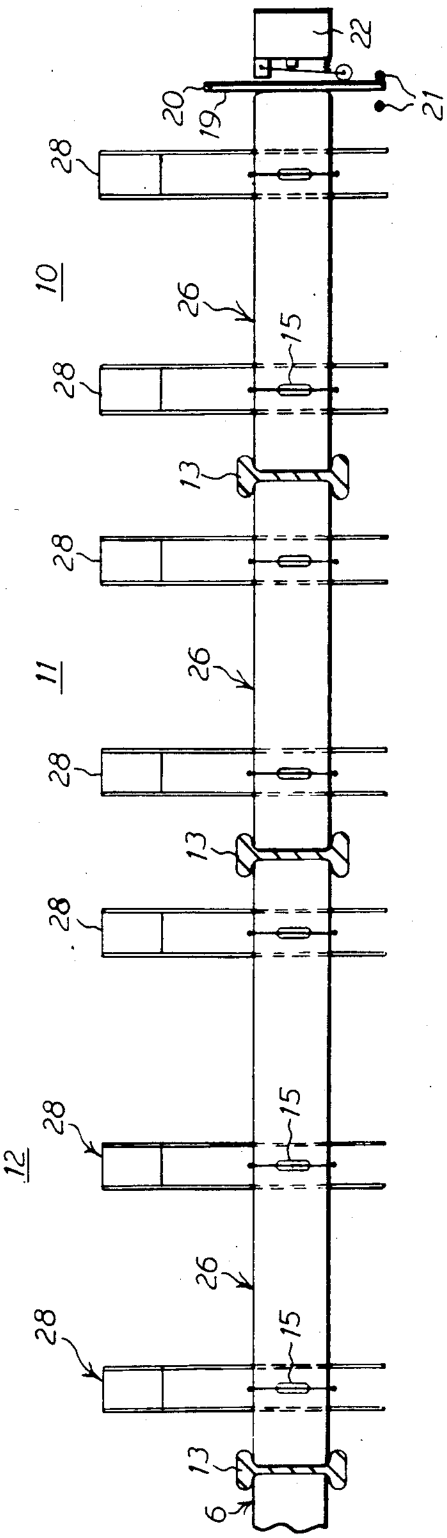
FIG. 8 is a schematic sectional view on line VIII—VIII in FIG. 2.
Figure 9:
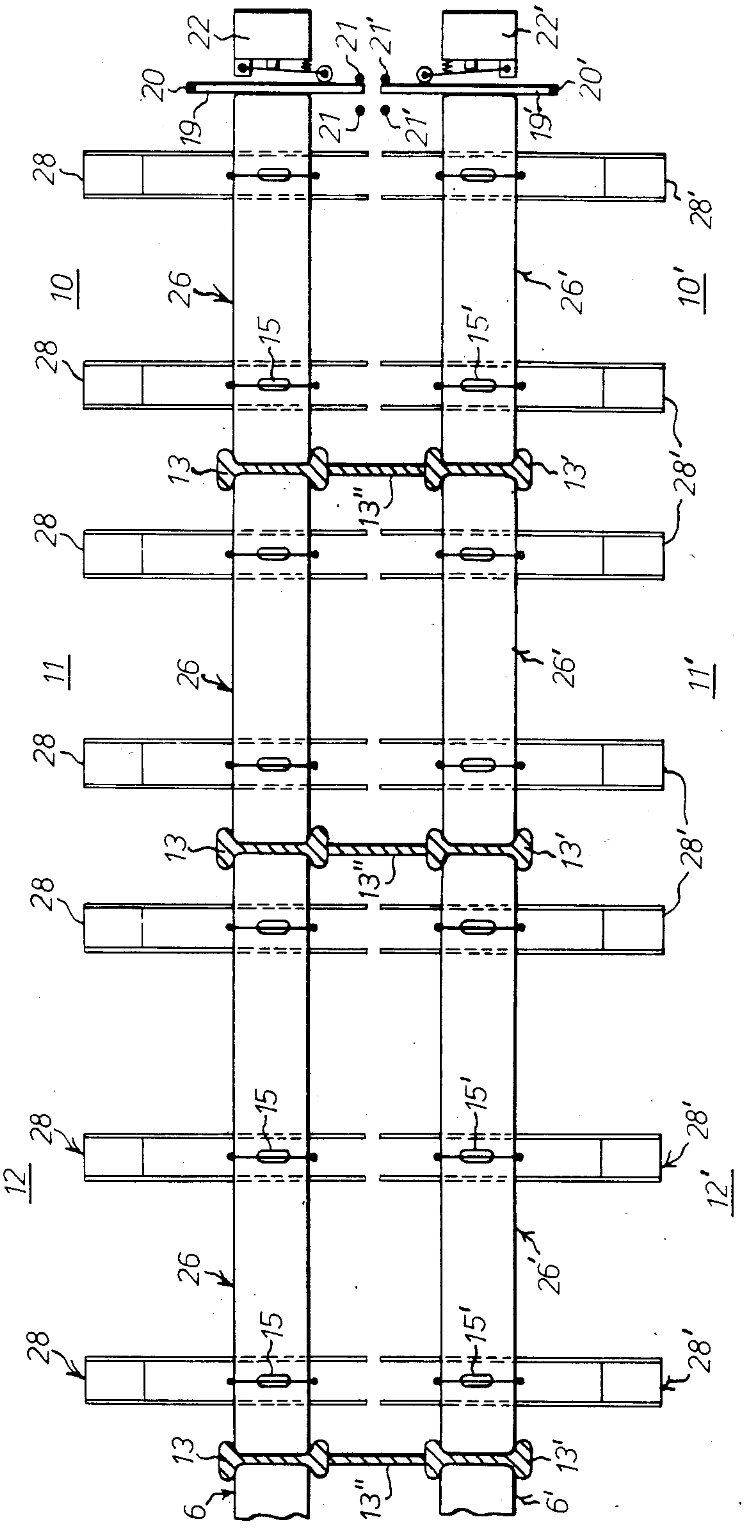

FIG. 9 corresponds to FIG. 8 but illustrates a modified machine comprising two slat advancing paths with common punching tools.

Referring to the drawings, a Venetian blind production machine according to the present invention comprises a frame 1 having an elongate machine bed 2 along which a number of punches, magazines and lifting units can be clamped in desired positions suitable to the Venetian blind production details concerned. The different units are interconnected by a main shaft 3 which is driven by a motor 4. At the feed-in end of the machine, a supply reel 5 is provided for supplying a metal strip 6 which passes over a guide pulley 7 to be fed, by means of drive roller 8, in the longitudinal direction of the machine in a manner explained in detail below. The drive rollers 8 are driven by a motor (not shown). As will appear from FIG. 8 which merely shows the right-hand end of the machine in FIG. 1, several different Venetian blinds having respective slats 26 can be produced simultaneously in different mounting stations 10, 11, 12 separated from one another by means of punching stations equipped with punches 13 which are shown in section in FIG. 8. The left-hand punch 13 in FIG. 8 may be a separating punch separating the different slats from the free end portion of the metal strip. In this case, the machine has a length which makes it possible to produce three Venetian blinds at the same time.

Figure 1:
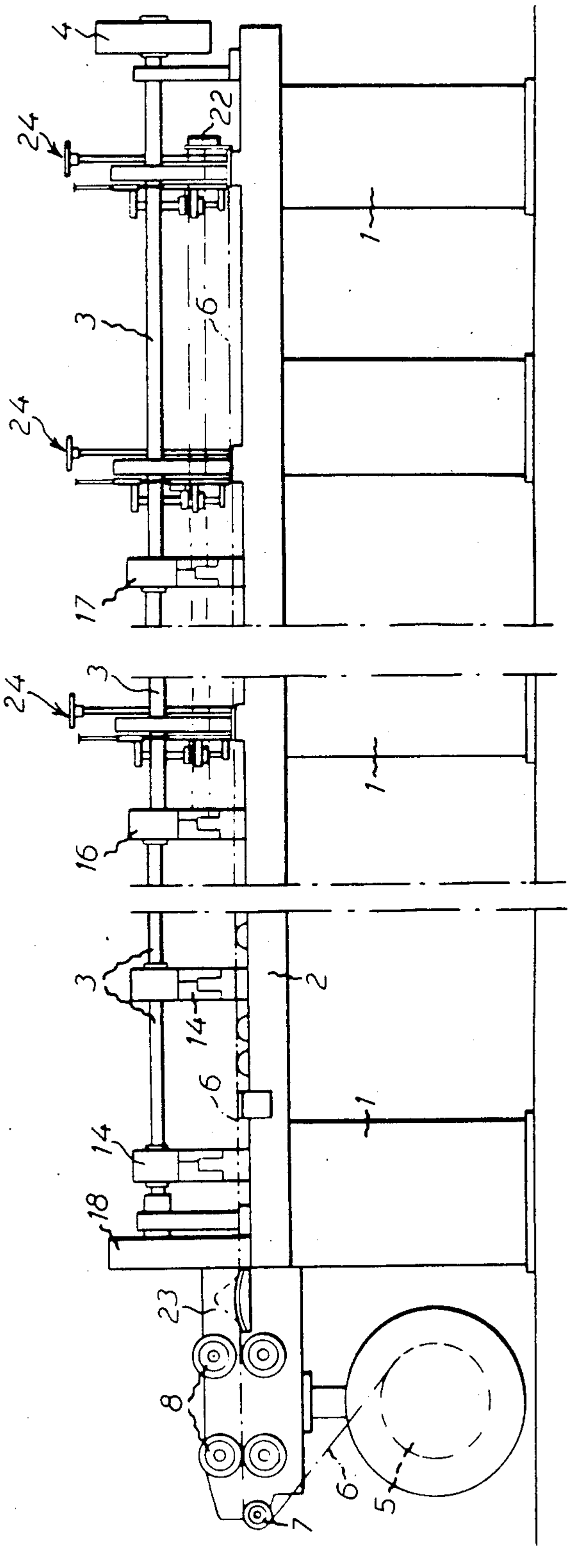
FIG. 1 is a lateral view of parts of a Venetian blind production machine according to the invention.

FIG. 1 shows some of the punching units 14 of a punching section serving to punch the lift cord holes 15 of the Venetian blind slats 26. This Figure also shows a punch unit 16 mounted at the junction between the machine punching section for lift cord holes (the left-hand part of FIG. 1) and the machine section for mounting Venetian blinds (to the right of the punch 16). Furthermore, a separating punch unit 17 is shown which forms the junction between two Venetian blind mounting stations, for example the stations 10 and 11. At the left-hand end of FIG. 1, the machine has a clamping device 18 for clamping the metal strip 6 during the joint punching runs in the machine. Thus, the machine first advances the strip 6 through all of the stations up to an end stop 19 (FIG. 8) mounted for pivotal movement on an axis 20 between two abutments 21. The movement of the end stop 19 is sensed by a microswitch 22 which, upon sensing of the metal strip end, activates the clamping device 18 and clamps the metal strip. Before that, the metal strip has been advanced such that it positively forms a loop 23. While the clamping device 18 is activated, punching is effected by means of all punches 14, 16, 17. The portion of the metal strip 6 between the clamping device 18 and the punch 16 is thus provided with lift cord holes 15 for respective slats of each set of blinds. Simultaneously, blind slats 26, already punched at the punching section, are separated by the punches 16, 17.

The different mounting stations also are provided with lifting and magazine units 24 of a design specified in the following description.

Figure 2:
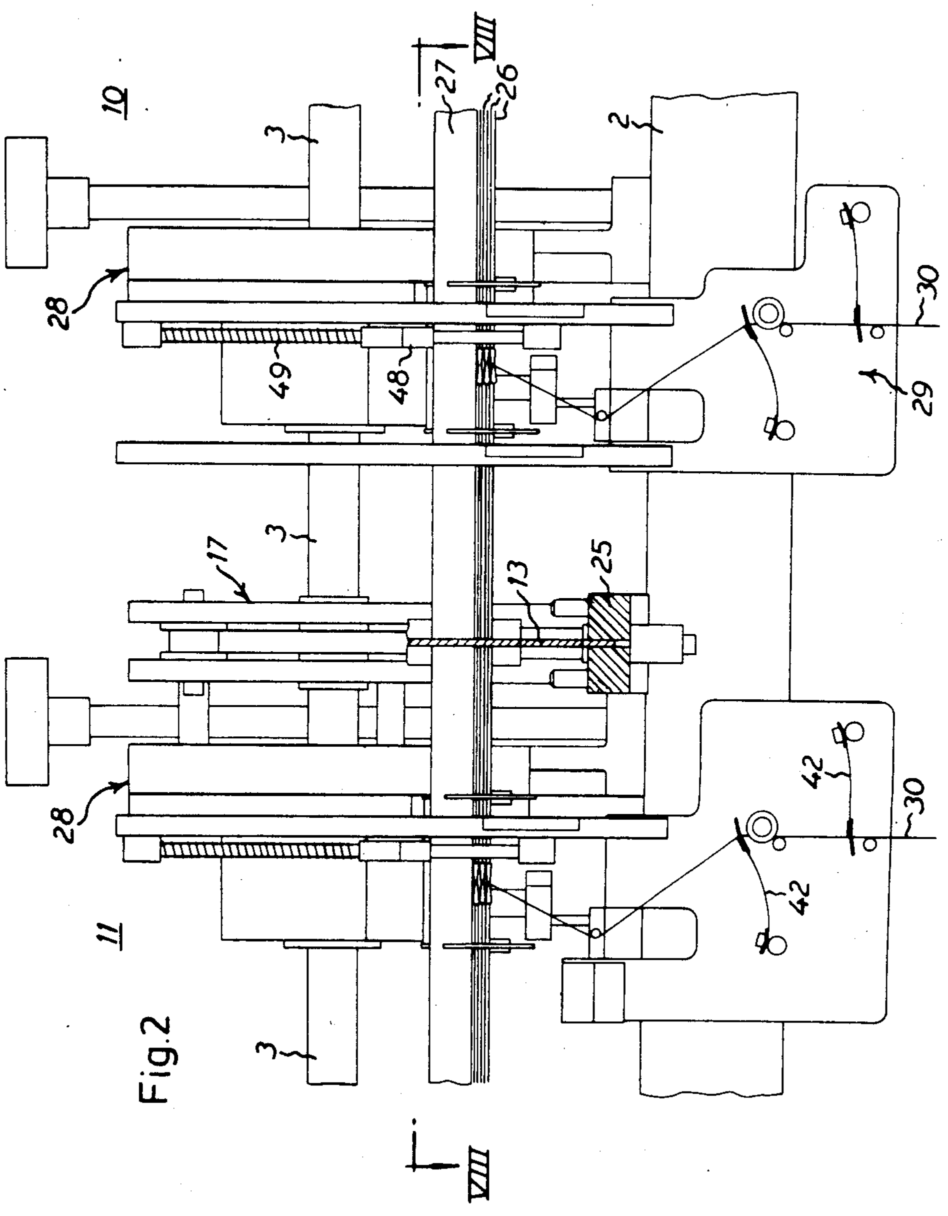
FIG. 2 illustrates, on a larger scale, a detail of the machine bed at the junction between two Venetian blind mounting stations.

FIG. 2 illustrates on a larger scale the junction between two mounting sections, for example the sections 10 and 11, in the Venetian blind production unit. FIG. 2 shows the position of the machine after punching and after lifting of the mounted slats. Thus, the punch 17 with a respective punching unit 13 has just separated the slats from one another in that the punching unit 13 has penetrated down into its die 25. The separated slats 26 have been lifted against the underside of the upper rail 27 of the Venetian blind by means of the lifting units 28 the construction of which is shown in more detail in FIG. 5. A ladder-tape supply device 29 is designed in known manner and ensures that the rungs of the ladder-tapes are placed alternately on one side and then the other side of the lift cord holes of the different Venetian blind slats 26.

Figure 7:
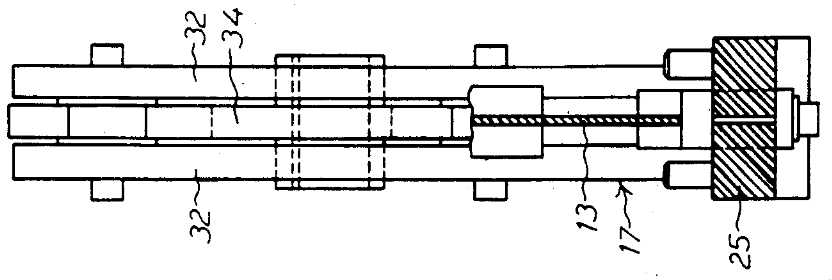
FIG. 7 is a section on line VII—VII in FIG. 6.
Figure 6:
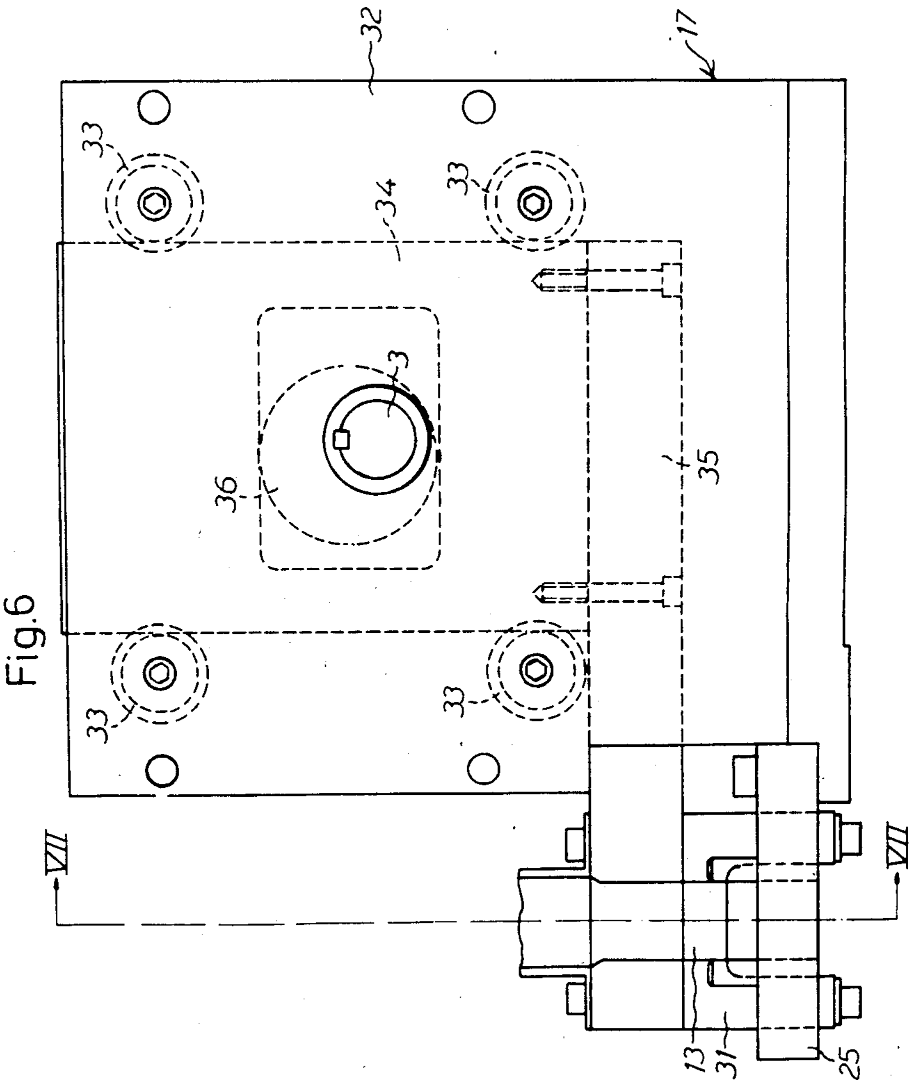
FIG. 6 is a lateral view of a punching unit for insertion at the junction between two adjacent Venetian blind production stations.

FIGS. 6 and 7 illustrate a separating punch 17 in more detail. The punching unit 17 has a punch 13 cooperating with a die 25. The design of the die 25 and the punch 13 will appear from the sectional view shown in FIG. 8 and directly produces finished ends of the different Venetian blind slats 26. The punch die 25 is stationary relative to the machine bed 2 and is fixedly mounted in a holder 31 which is connected with plates 32 in which four guide wheels 33 are mounted. The guide wheels control the reciprocatory movement of a slide 34 connected with an arm 35 on which the punch 13 is mounted. The slide 34 is connected with the main shaft 3 via an eccentric 36. Upon rotation of the main shaft, the slide 34 and thus the punch 13 will move up and down.

Figure 5:
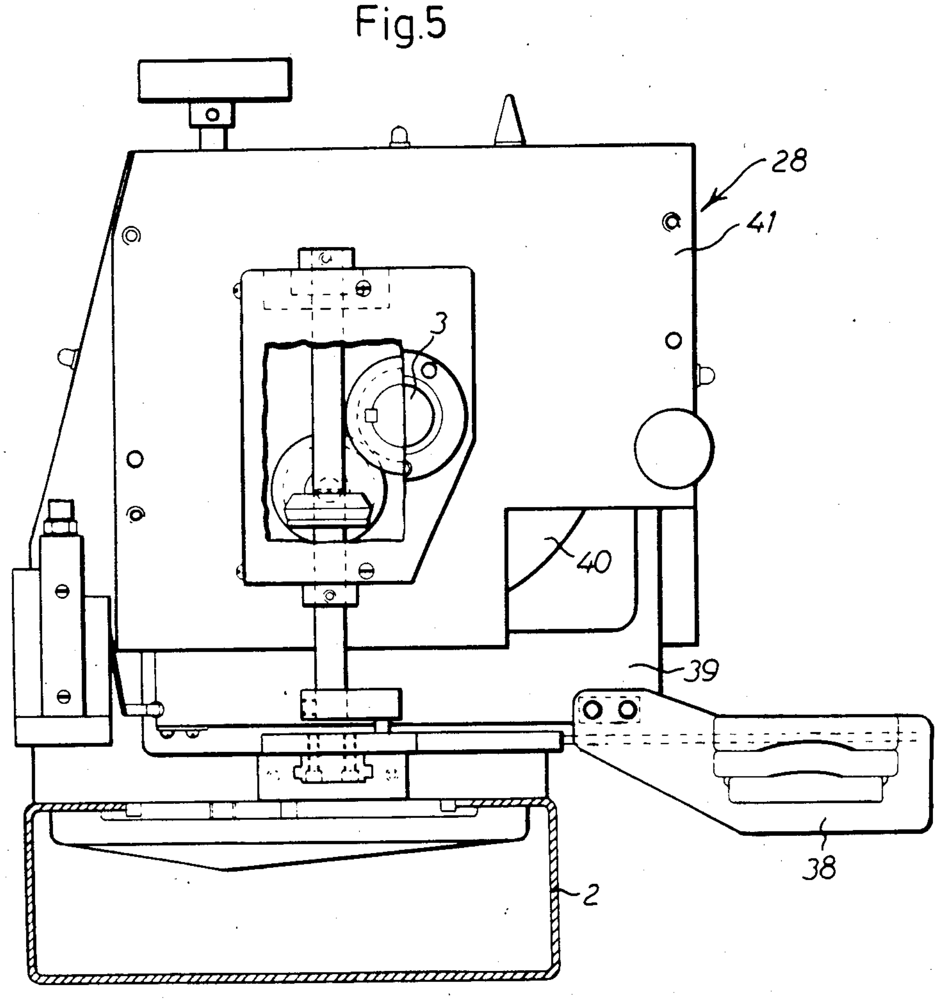
FIG. 5 is a lateral view of a lifting section in the Venetian blind production machine.

FIG. 5 illustrates an example of the design of a lifting unit 28. The lifting unit has a lifting arm 38 which is mounted on a plate 39 movable up and down by means of an eccentric between two frame plates 41 that can be affixed to the machine bed 2. The eccentric 40 is connected with the main shaft 3 of the machine. The lifting movements of the lifting arm 38 are synchronized with the movements of the punches 13, such that the correct operational sequence is obtained.

Figure 3:
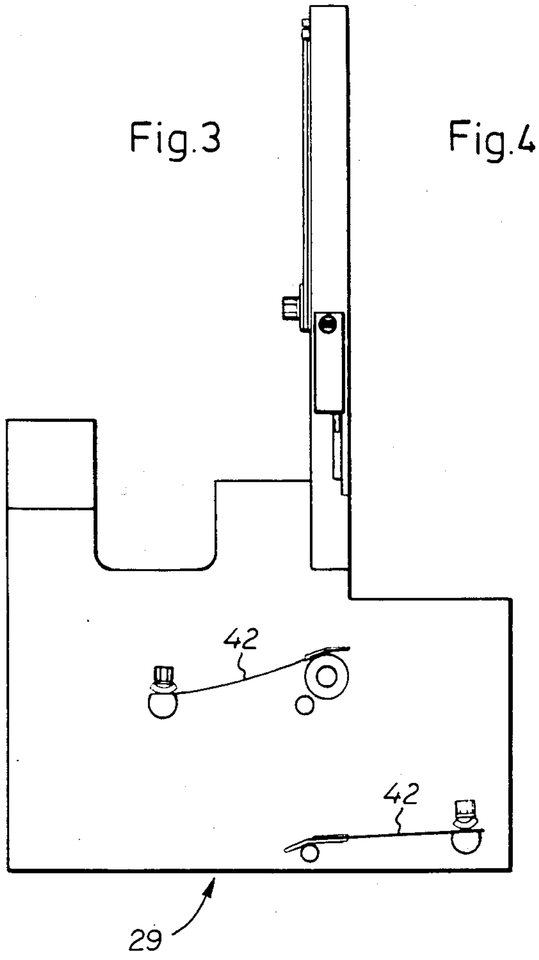
FIG. 3 illustrates an alternative embodiment of a magazine in a Venetian blind production machine.
Figure 4:
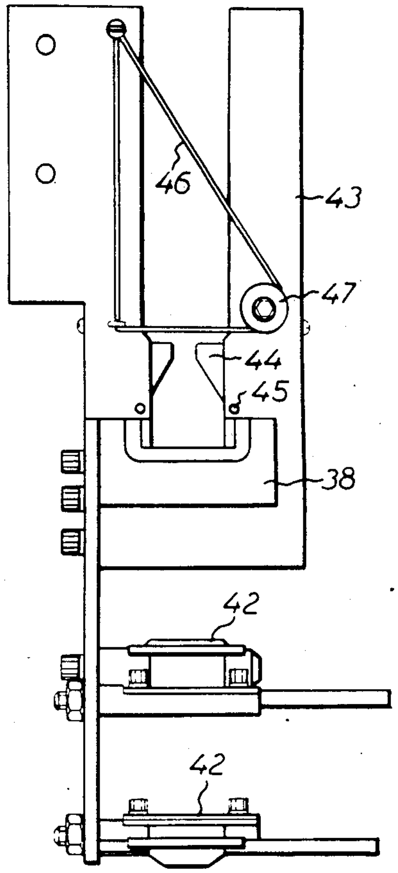
FIG. 4 is a lateral view of the magazine.

FIGS. 3 and 4 illustrate an example of the design of the different magazines in the machine. The magazine 29 has clamping means 42 for aligning the ladder-tapes 30 and keeping them taut during mounting. The upper part 43 of the magazine is provided with flaps 44 pivoting on journals 45. When the Venetian blind slats 26 are lifted, they are urged past the pivotal flaps 44 which then hold the lowermost slat 26 and all overlying slats and also the rail 27, while the lifting arm 38 returns to its position below the level of the path in which the metal strip 6 is advanced. In the embodiment illustrated in FIGS. 3 and 4, a resilient tape 46 is used which holds the finished parts of the Venetian blind down against the flaps 44 and which for this purpose travels over a guide pulley 47.

In the embodiment shown in FIG. 2, use is made instead of a spring-biased arm 48 which, by means of a spring 49, is urged against the upper side of the mounting rail 27 of the Venetian blind.

As will appear from the above description, the Venetian blind production machine according to the present invention makes it possible to increase considerably the production rate, i.e. to decrease the machine time for each Venetian blind. This is made possible on the one hand in that the several Venetian blinds are manufactured during each punching and lifting operation and, on the other hand, in that the acceleration and retardation times during production are reduced considerably. In the above-described embodiment, it is possible to have a machine cycle during which acceleration from standstill to high speed is accomplished, for example, in a distance of 50 mm, after which braking is initiated at, for example, 250 mm before the end stop 19. The actual cutting/punching, lifting, and folding of the ladder-tapes can be carried out in but 0.6 second. For example, if five Venetian blinds are manufactured simultaneously, the total length of these blinds being 4 m, it is possible, at an advancing speed of 0.21 second/800 mm during the high-speed advancing, to produce these five Venetian blinds with 82 slats each during a mounting time of about 170 seconds.

The invention may, of course, be modified in many different ways without departing from the basic idea, i.e. maximum utilization of the machine with a minimum of acceleration and retardation periods, all lift cord holes being punched in the free end portion of the metal strip while simultaneously separating finished Venetian blind slats from a strip portion in which lift cord holes have previously been punched.

A further modification of the invention is shown in FIG. 9. In this Venetian blind production machine, two slat advancing paths have been connected in parallel, such that two metal strips 6, 6' are punched and worked in the same manner as the metal strip 6 in the embodiment according to FIGS. 1–8. For the sake of simplicity, like reference numerals, although primed, have been used for like components. The essential difference between the embodiment according to FIGS. 1–8 and the embodiment according to FIG. 9 is that the punches 13, 13' are joined together in pairs by means of connecting members 13" and thus are operated jointly by means of a common punch driving motor. To ensure that the two metal strips 6, 6' have reached the correct punching position before punching is initiated, two microswitches 22, 22' may be interconnected such that both must have been activated by the metal strips before punching can begin. By doubling the machine in this manner, the capacity is doubled. It will be appreciated that this basic idea can, of course, be increased to three or four parallel slat advancing paths and the associated punching and other equipment. It if is desired to produce Venetian blinds of different lengths in two adjacent advancing paths, separate punches may be introduced into either one of these paths such that but a few or perhaps none of the punches are common to the slat advancing paths.

I claim:

1. A Venetian blind production machine having feeding means for advancing from a supply reel at least one strip of Venetian blind material intermittently in the longitudinal direction of the strip and for inserting the strip through a number of ladder-tapes, and having a punching station with means for punching lift cord holes in a free end portion of the strip before that end portion is inserted in the ladder-tapes, and a separating station with means for separating said free end portion of the strip from the remainder of the strip to form individual Venetian blind slats inserted in the ladder-tapes, said machine being characterized in that the lift cord hole punching means has at least two spaced punching tools operable upon an advance of said strip to punch lift cord holes in at least two successive longitudinal portions of said free end portion of said strip, which successive portions correspond to a plurality of Venetian blind slats, and that said separating station has separating punch means for simultaneously separating said successive portion from one another to form said plurality of Venetian blind slats upon a further advance of said strip, with said plurality of said slats being respectively inserted in corresponding ladder-tapes.

2. A Venetian blind production machine as claimed in claim 1, characterized in that the separating punch means of said separating station includes for each of said plurality of slats a punch and a punch die which are configured such that the end portions of said Venetian blind slats are simultaneously punched and finally shaped.

3. A machine as claimed in claim 1, characterized in that each punch and a recess of the corresponding punch die of said separating punch means are I-shaped.

4. A machine as claimed in claim 1, characterized in that said punching station has at least two sets of punching tools respectively disposed along at least two parallel Venetian blind strip material advancing paths and that said separating station has at least two separating punch means respectively disposed along said parallel advancing paths and interconnected for conjoint operation and concurrent separation of Venetian blind slats in said parallel advancing paths.

5. A machine for the production of Venetian blinds, comprising means for intermittently advancing a strip of Venetian blind material lengthwise of said strip, and a lift cord hole punching station and a slat separating station arranged in succession along a path of advance of said strip such that said strip is advanced to said punching station and then to said slat separating station, said punching station having means operable upon an advance of said strip for punching lift cord holes in successive lengthwise portions of said strip, said successive portions of said strip corresponding to a plurality of Venetian blind slats, said separating station having means operable upon a further advance of said strip for separating said successive portions of said strip from one another to yield said plurality of Venetian blind slats.

6. A machine according to claim 5, including additional punching means and separating means disposed in succession along a path of advance parallel to the first mentioned path of advance such that a second strip of Venetian blind material may be advanced, punched, and separated into a plurality of slats along the second mentioned path of advance, the separating means of said second mentioned path of advance being interconnected and conjointly operable with the separating means of said first mentioned path of advance such that respective pluralities of Venetian blind slats are produced concurrently in the aforesaid paths of advance.

7. A machine according to claim 5, wherein said means for advancing said strip is operable to advance said strip in a predetermined length increment equal to at least the combined lengths of said plurality of slats.

8. A machine according to claim 5, wherein said separating means is operable to separate said successive portions of said strip simultaneously.

9. A machine according to claim 5, wherein said separating station includes means for supporting ladder-tapes for each of said plurality of slats such that said strip inserts through said ladder-tapes when advanced to said separating station and wherein said separating station includes means for assembling and retaining each of said plurality of slats with corresponding slats previously inserted through said ladder-tapes.

* * * * *